United States Patent [19]

Hutcheson et al.

[11] Patent Number: 5,551,059
[45] Date of Patent: Aug. 27, 1996

[54] METHOD AND SYSTEM FOR INTELLIGENT CELL SELECTION USING DOPPLER DATA IN CELLULAR SYSTEMS

[75] Inventors: Jonathan E. Hutcheson, Tempe; Kadathur S. Natarajan, Mesa; Raymond J. Leopold, Tempe, all of Ariz.

[73] Assignee: Motorola, Inc., Schaumburg, Ill.

[21] Appl. No.: 331,461

[22] Filed: Oct. 31, 1994

[51] Int. Cl.⁶ .................................................. H04Q 7/00
[52] U.S. Cl. ..................... 455/33.2; 455/33.1; 455/54.1
[58] Field of Search ........................... 455/12.1, 13.1, 455/33.1, 33.2, 33.4, 34.1, 34.2, 54.1, 56.1, 62; 379/59, 60

[56] References Cited

U.S. PATENT DOCUMENTS

| | | | |
|---|---|---|---|
| 5,095,500 | 3/1992 | Tayloe et al. | 379/59 |
| 5,161,248 | 11/1992 | Bertiger et al. | 453/33.2 |
| 5,212,822 | 5/1993 | Fukumine et al. | 455/33.2 |
| 5,239,667 | 8/1993 | Kanai | 455/33.2 |
| 5,379,447 | 1/1995 | Bonta et al. | 455/33.2 |
| 5,386,589 | 1/1995 | Kanai | 455/33.1 |
| 5,394,561 | 2/1995 | Freeburg | 455/33.2 |
| 5,432,521 | 7/1995 | Siwiak | 455/12.1 |
| 5,432,843 | 7/1995 | Bonta | 455/33.2 |
| 5,436,956 | 7/1995 | Shiotsuki et al. | 455/33.2 |
| 5,450,473 | 9/1995 | Shiotsuki et al. | 455/33.2 |
| 5,455,964 | 10/1995 | Roos et al. | 455/54.2 |

FOREIGN PATENT DOCUMENTS

WO93/000777 1/1993 WIPO ............................ 455/54.1

Primary Examiner—Reinhard J. Eisenzopf
Assistant Examiner—Marsha D. Banks-Harold
Attorney, Agent, or Firm—Kevin K. Johanson

[57] ABSTRACT

A cellular communication system projects multiple cells throughout a user area. Subscriber units (24) encounter multiple cells as they roam through the user area or as the cells migrate past the subscriber unit (24). When a subscriber unit (24) encounters the fringe area of a cell it maintains contact with the system by selecting and transitioning to a target cell. The subscriber unit (24) performs an analysis using Doppler data of the location, proximity, and expected duration of exposure to candidate target cells. The subscriber unit (24) selects a target cell based on these factors.

19 Claims, 3 Drawing Sheets

5,551,059

METHOD AND SYSTEM FOR INTELLIGENT CELL SELECTION USING DOPPLER DATA IN CELLULAR SYSTEMS

RELATED INVENTIONS

The present invention is related to the following inventions which are assigned to the same assignee as the present invention:

Method And System For Intelligent Cell Selection Using Location Data In Cellular Systems, Ser. No. 08/331,863; filed concurrently herewith and assigned to the assignee of the present invention.

TECHNICAL FIELD

This invention relates generally to cellular communications systems and, in particular, to methods and systems for selecting target cells used by subscriber units in performing cell-to-cell transitions, and performing initial cell selections.

BACKGROUND OF THE INVENTION

A cellular communications system projects any number of cells over the earth at diverse locations. A spectrum is allocated in frequency, in time, by coding, or a combination of these, to the cells so that communications taking place in nearby cells use different channels to minimize the chances of interference. On the other hand, communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results without interference.

One problem which cellular communications systems address is the transitioning of communications between cells, as well as the selection of an initial cell. Relative movement between end users and cells causes the end users and the communication links directed thereto to move between cells. In order to permit continuous communications in an ongoing call, the system must "handoff" an in-process call when the end user crosses a cell boundary. If a call is not handed-off to a new cell upon leaving an old cell, the call will eventually be lost because the strength of signals over which communications take place would diminish to a point where the system's radio equipment cannot receive the end user's transmissions, or vice versa.

This selection of a new cell is also necessary for servicing cell determination, a process wherein a subscriber unit transitions to a new cell in order to be available to receive or initiate communications.

Conventional cellular communications systems address the transition problem (e.g., handoff and servicing cell determination) by monitoring and comparing signal strength. A currently used channel associated with one cell may be monitored and compared by a subscriber unit in another cell. Communications are then passed off to the cell with the stronger signal.

The conventional transition technique may work adequately when the distances between subscriber units and system transceivers are relatively small, when the speeds of movement between cells and subscriber units are slow, and when transitions are relatively evenly distributed in time. Historically, such conditions existed for conventional terrestrial cellular systems. In such systems cells did not move with respect to the earth, and the movement between cells and subscriber units resulted from subscriber unit movement in accordance with conventional modes of transportation. However, as traditional cells become congested and are sub-divided into micro-cells, transitions occur more frequently.

Also in satellite cellular systems, where radio equipment is located on satellites orbiting the earth in moving orbits, transitions between cells are also frequent, and the conventional transition techniques may be inadequate.

For example, orbiting satellites are located a relatively large distance from subscriber units, often on the order of several hundred kilometers. The smaller this distance, the greater the speed of the satellite relative to a particular position on the earth. Speeds of over 20,000 km/hr are typical. This fast movement relative to a subscriber unit introduces widely and rapidly varying propagation delays and Doppler frequency offsets into signals transmitted between a satellite and a subscriber unit.

As a mobile subscriber moves from one cell to another cell, a transition procedure is employed. The gateway or switching network indicates to the mobile subscriber to change frequencies from a channel which was used in the first cell to a new frequency of a new channel used in the second cell.

Because there are a number of contiguous cells to which a mobile subscriber may travel, a method for determining into which cell the subscriber is to transition is required. If the subscriber is transitioned into an incorrect cell with a new frequency, the mobile subscriber's call will become lost and disconnected, or calls directed to or originated from him will be undeliverable. Such transition decision making is typically accomplished by measuring the amplitude of the signal received from the mobile subscriber. One such terrestrial cellular telephone system is shown in U.S. Pat. No. 4,654,879, issued on Mar. 31, 1987, to S. Goldman.

Modern terrestrial cellular systems, using higher frequencies for communications, improve the detectability of relative motion between subscriber units and transceivers. Motion may be detected by evaluating Doppler values introduced by motion. Also in satellite cellular systems, the cells projected on the earth are much larger than those of the terrestrial systems. In addition, the satellite moves quite rapidly and as a result, subscribers must be transferred from one cell to the next much more often than in terrestrial systems.

Accordingly, it is an advantage of the present invention to provide a method for selecting target cells using Doppler data for servicing cell determination and handoffs in a cellular communication system.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
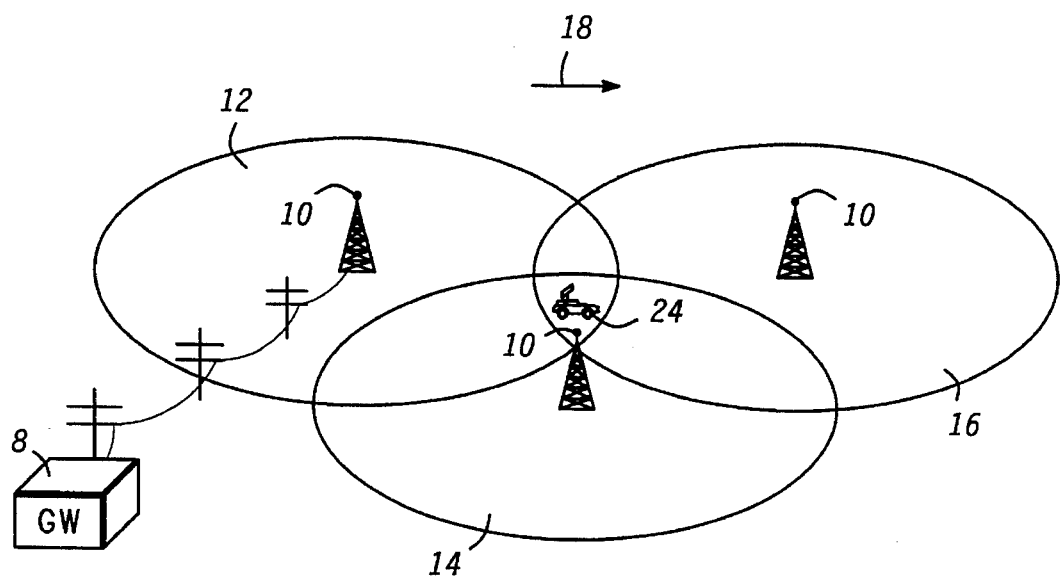
FIG. 1 shows a diagram of a terrestrial cellular communications system within which the present invention may be practiced.

FIG. 1 shows a diagram of a terrestrial cellular communications system within which the present invention may be practiced. A gateway 8 interfaces between conventional telephony infrastructure and a cellular system. Gateway 8 may interface to the public switched telephone network or any other communications system. Gateway 8 also includes cellular system planning functions such as call termination routing instructions, and other system planning functions including generation of control channel lists for delivery to subscriber units 24.

As subscriber unit 24 commutes throughout a cellular system, it passes through multiple beams. Subscriber unit 24 must select a target cell between possibly many choices. Subscriber unit 24 must select a target cell upon first arriving or powering-on in a system. Target cell selection during such a non-communication period is known as "servicing cell determination" although servicing cell determination as known in the art may involve additional functionality (i.e., location reporting, etc.) which is beyond the scope of this invention.

Subscriber unit 24 must also select a target cell upon roaming while communicating in a cellular system. Selection of a cell during communications is known as a "handoff." Handoff concepts, as known in the art, also have broader functionality not described in this invention.

Each terrestrial transceiver 10 projects a cell about itself using non-adjacently interfering frequencies or channels. The cells projected by terrestrial transceivers 10 need not be regularly shaped and are shown as circular patterns for convenience. The particular shape of the cell is not important for this invention. Each cell transmits a control channel which may contain a variety of information such as location of available communications channels, cell footprint or location information, time of day, cell identification, etc. Each control channel is specific to that cell, and information from individual control channels may be used to discriminate and evaluate the desirability of each cell.

Subscriber unit 24, as shown in FIG. 1, resides in cell 12. Subscriber unit 24 has a computing means and a transceiving means for executing the method described herein. Transceiving and computing means are well known in the art consisting of microprocessors, memories, transmitters, receivers, synthesizers, timers, etc.. As subscriber unit 24 continues traveling in direction 18, subscriber unit 24 eventually reaches the fringes of cell 12 as shown. Subscriber unit 24 detects this by noting a decrease in signal quality or other monitorable characteristic such as a range or distance from the cell origin. Subscriber unit 24 begins selecting a target cell. As is shown in FIG. 1, subscriber unit 24 may be located within both non-servicing cells 14 and 16, with each having a sufficient signal quality. Subscriber unit 24 begins evaluating control channels as transmitted by terrestrial transceivers 10 in cells 14 and 16.

Unnecessary transfers to interim cells in cellular systems expends resources such as power and bandwidth. Additionally, unnecessary transfers to interim cells may lead to loss of communications through mis-routed data, or rapidly declining signal coverage. As is shown in FIG. 1, subscriber unit 24 may select cell 14 if selection were based solely on signal quality, however, cell 14 would be entirely an interim cell while selection of cell 16 would provide service for an extended period of time.

Movement of subscriber unit 24 within the fixed-site transceiver system causes communications between terrestrial transceiver 10 and subscriber unit 24 to contain a Doppler frequency value. This Doppler value varies with the velocity of subscriber unit 24 and with the incident angle to terrestrial transceivers 10. An embodiment of the present invention utilizes Doppler information to perform selection of a target cell.

Figure 2:
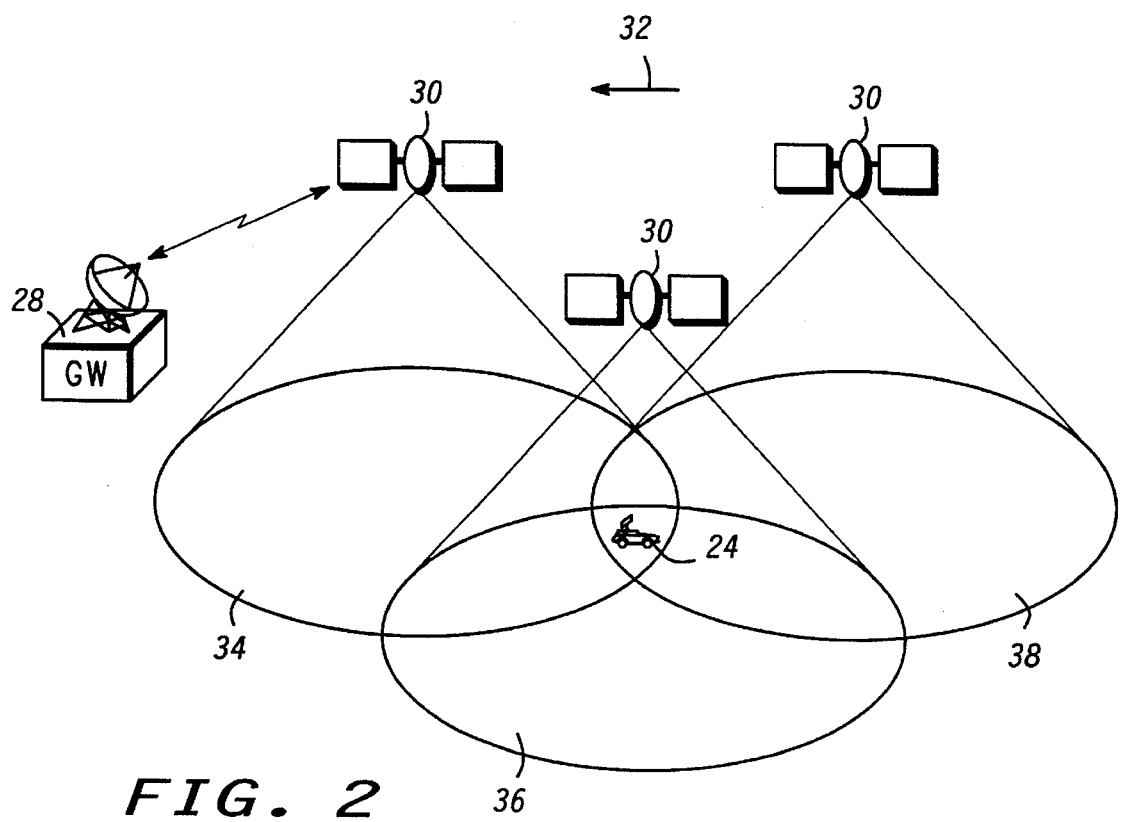
FIG. 2 shows a diagram of a satellite cellular communications system within which the present invention may be practiced.

FIG. 2 shows a diagram of a satellite cellular communications system within which the present invention may be practiced. A gateway 28 interfaces between conventional telephony infrastructure and a cellular system. Gateway 28 may interface to the public switched telephone network or any other communications system. Gateway 28 also includes cellular system planning functions such as call termination routing instructions, and other system planning functions including generation of control channel lists for delivery to subscriber units 24. Satellite transceivers 30 orbit in direction 32 while projecting cells upon the earth. Subscriber unit 24 must select a target cell between possibly many choices. As discussed above, subscriber unit 24 must select a target cell upon servicing cell determination or during handoffs. Each satellite transceiver 30 projects a single cell or multiple cells upon the earth, and satellite transceiver 30 broadcasts a unique control channel in each cell.

As described above in FIG. 1, intelligent cell selection of target cells reduces transfers and complications that may arise from unnecessary transfers to interim cells. Movement of satellite transceivers 30 relative to subscriber unit 24 creates a Doppler frequency value in communications transmissions. This Doppler value varies with the incident angle between subscriber unit 24 and orbiting satellite transceivers 30. Subscriber unit 24 evaluates a Doppler value to discriminate between advancing and receding satellites and, with knowledge of satellite orbital geometry, may determine relative ranges of satellite transceivers 30. One embodiment of the present invention employs Doppler values and signal quality for performing target cell selection.

Satellite transceivers 30, like terrestrial transceivers 10 (FIG. 1), transmit unique control channels into each cell. These control channels contain location data describing the geometry of the specific cell. Thus satellite transceiver 30 generating cell 34 transmits a control channel unique to cell 34 that contains location data describing cell 34's present location.

Subscriber unit 24, as shown in FIG. 2, resides in cell 34. As satellite transceivers 30 continue to orbit in direction 32, subscriber unit 24 eventually reaches the fringes of cell 34 as shown. Subscriber unit 24 detects this by noting a decrease in signal quality or other monitorable characteristic such as a range or distance from the cell origin. Subscriber unit 24 begins selecting a target cell. As is shown in FIG. 2, subscriber unit 24 may be located within both cells 36 and 38, each having a sufficient signal quality. Subscriber unit 24 begins evaluating control channels as transmitted by satellite transceivers 30 in cells 36 and 38.

Figure 3:
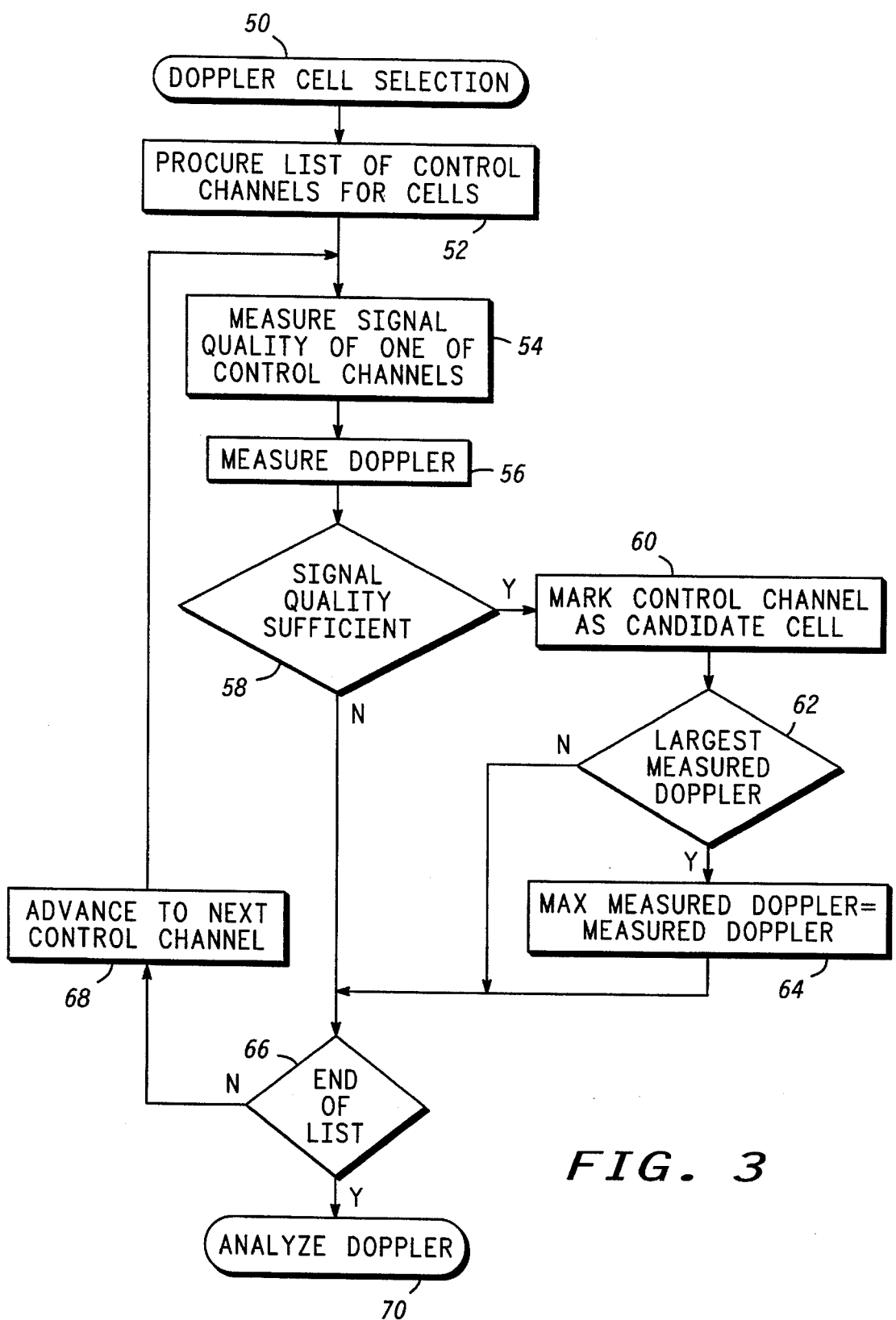
FIGS. 3 and 4 show flowcharts for a method of target cell selection using Doppler and signal quality data, in accordance with a preferred embodiment of the invention.
Figure 4:
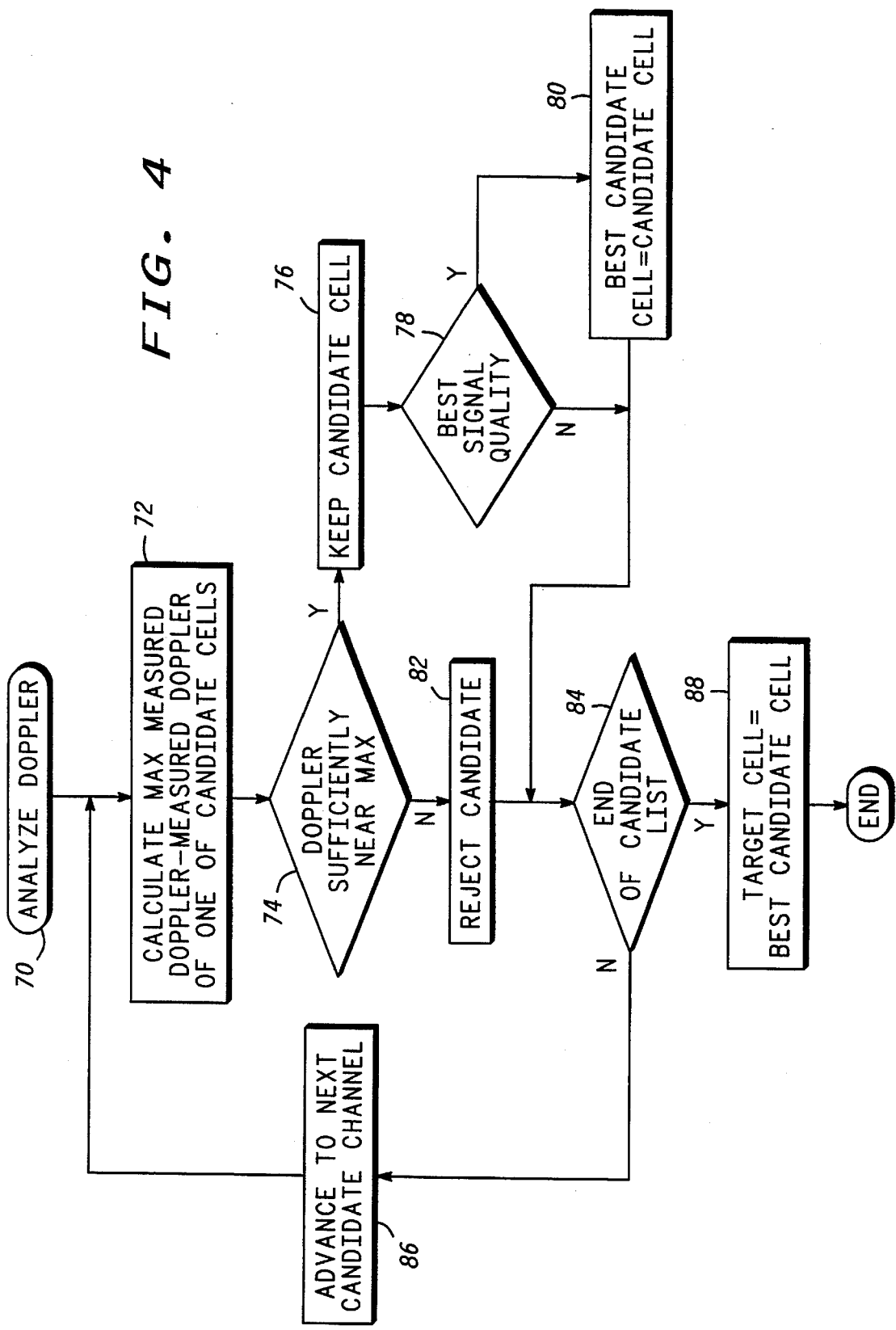

FIGS. 3 and 4 show flowcharts for a method of target cell selection using Doppler and signal quality data, in accordance with a preferred embodiment of the invention. As communications quality in subscriber unit 24's servicing cell diminishes, subscriber unit 24 initiates a Doppler cell selection method 50 for evaluating cells emanating from a different terrestrial transceiver 10 (FIG. 1) or a different satellite transceiver 30 (FIG. 2).

A task 52 retrieves a list of control channels to be evaluated by subscriber unit 24. A control channel list may have arrived at subscriber unit 24 from one of several sources. A list may have been installed upon subscriber unit configuration, delivered by the system in an earlier transmission, or defined by cellular frequency reuse patterns. A control channel list contains identifiers of potential target cells. Identification may be frequency or channel identifiers known by subscriber unit 24.

In a task 54, subscriber unit 24 begins analyzing the signal quality of a member of the control channel list. Tasks 54 through 66 perform an initial analysis of a list of control channels. Shadowing or inoperative cells may produce inferior communications characteristics in some control channels on the list. These wanting cells do not warrant additional analysis and are therefore eliminated from further evaluation.

Subscriber unit 24 receives a sample of a control channel and analyzes the signal quality. This analysis may use receive power level, Bit Error Rate (BER) analysis or any known signal quality evaluation technique.

A task 56 measures a Doppler value for a received control channel sample under examination using Doppler measurement techniques known in the art. Doppler values are subsequently used to evaluate the desirability of a potential target cell.

Query task 58 compares a received control channel sample against a threshold value known by subscriber unit 24. The comparison threshold value may be defined by the system or dynamically adjusted by a subscriber unit 24 to maintain reliable communications.

If the signal quality is sufficient to warrant additional observation, then subscriber unit 24, in a task 60, notes the control channel under evaluation as a candidate cell and, as such, will perform additional processing as shown in FIG. 4.

A query task 62 determines a maximum measured Doppler value by comparing the Doppler value of the present cell under evaluation with a stored value of the largest Doppler value thus far. If this is the first control channel to be evaluated, then a task 64 will retain the measured Doppler value as the benchmark used to compare remaining control channels from the list. This method uses the maximum measured Doppler value for subsequent control channel evaluations.

Upon completion of either tasks 62, 64, or an insufficient signal quality measurement in task 58, a query task 66 evaluates the completion of sampling each control channel on the control channel list.

If the complete list has not been sampled, then a task 68 advances analysis to the next member of the control channel list. Evaluation of the next member of the control list then proceeds to task 54, and analysis continues as described above. Completion of the analysis of the entire control channel list then proceeds to an Analyze Doppler procedure 70 as shown in FIG. 4.

In FIG. 4, the list of candidate cells as established in task 60 (FIG. 3) receives further evaluation. Tasks 72 through 84 perform a secondary and tertiary screening of candidate cells. Tasks 72 through 76 compare each remaining candidate cell for its proximity to a maximum Doppler benchmark value discovered in task 62 (FIG. 3). If candidate cells are sufficiently near a maximum Doppler bench mark, then they are retained. Tasks 78 and 80 perform a final analysis by searching those cells having Doppler values sufficiently near the maximum for the cell having the best signal quality.

A task 72 tests the proximity of a candidate cell's Doppler value to the maximum measured Doppler value as found above in tasks 62 and 64 (FIG. 3).

A query task 74 evaluates the proximity of a candidate cell's Doppler value to the maximum measured Doppler value. Only candidate cells having Doppler values representative of a less receding cell are retained in a task 76. In a task 82, a threshold value is used to dismiss less desirable candidate cells.

Ideally, the best candidate cells are those that exhibit adequate signal quality, and are most distant and approaching. However, shadowing and attenuation of signals due to subscriber unit surroundings often dictates selection of nearer cells or even a receding transceiver or satellite.

A query task 78 evaluates the signal quality of candidate cells retained in task 76. This task determines if the signal quality of the control channel currently being analyzed is the best of the cells evaluated thus far. This task utilizes the measurements taken in task 54 (FIG. 3), or additional measurements may be implemented if desired. If this is the first control channel to be evaluated in this step, then a task 80 will retain the measured signal quality as the benchmark used to compare remaining control channels from the further refined candidate list.

Upon completion of either tasks 82, 78, or 80, a query task 84 assesses the completion of testing of the candidate list. If the complete list has not been sampled, then a task 86 advances analysis to the next member of the list of candidate control channels.

When the entire candidate list has been examined, a task 88 assigns the candidate cell found to have the best signal quality, from task 80, as the target cell. The selection process is then complete. Subscriber unit 24 then proceeds to request the target cell as its new servicing cell. This request process is known in the art and generally follows a servicing cell determination process described earlier or a handoff procedure for in-process communications.

In an alternative embodiment, tasks 78 and 80 may prioritize candidate cells and forward a series or a list of target cells to task 88. A cell selection method may then forward this prioritized candidate list for use in requesting specific servicing cells.

It will be appreciated that the present invention therefore provides an improved method and system of selecting target cells in a cellular communication system. Additional cell specific information is analyzed to produce a more intelligent selection of a target cell.

Additionally, the present invention reduces the system overhead burden by intelligently selecting target cells to minimize cell transitions and therefore minimize system overhead associated with processing and confirming a transition request.

Additionally, by reducing the number of improper servicing cell determinations or handoffs in a communication system, the present invention reduces the probability of communication interruptions due to dropped communications during target cell transitions.

Furthermore, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of selecting a target cell for handing off a subscriber unit in a cellular communication system, said system having a plurality of transceivers projecting cells upon the earth, said method comprising the steps of:

(a) procuring a list of at least one control channel for evaluation within said subscriber unit;

(b) measuring a signal quality as received at said subscriber unit for one said at least one control channel;

(c) measuring a Doppler value for said one of said at least one control channel as received at said subscriber unit;

(d) retaining said at least one control channel in a group of candidate cells when said signal quality exceeds a signal quality threshold value;

(e) repeating steps (b) thru (d) for each of said at least one control channel; and (f) ordering said group of candidate cells according to said Doppler value of each of said at least one control channel; and (g) selecting said target cell from said group of candidate cells as ordered by said Doppler value.

2. A method as recited in claim 1, wherein step (a) further comprises the step of receiving at said subscriber unit said list of said control channels from said system.

3. A method as recited in claim 1, wherein said list in step (a) comprises searching all known control channels.

4. A method as recited in claim 1, wherein said list in step (a) comprises searching said control channels assigned for use in adjacent cells.

5. A method as recited in claim 1, wherein step (b) comprises the step of measuring a bit error rate of one of said control channels for determining said signal quality.

6. A method as recited in claim 1, wherein step (b) comprises the step of measuring a power level of one of said control channels for determining said signal quality.

7. A method as recited in claim 1, wherein step (g) comprises the step of selecting one of said candidate cells having largest said Doppler value.

8. A method as recited in claim 1, wherein step (g) comprises the steps of:

(g1) discarding said candidate cells not having said Doppler value greater than a threshold value; and (g2) selecting one of said candidate cells having best signal quality.

9. A method as recited in claim 8, wherein step (g2) comprises the steps of:

(g21) prioritizing said candidate cells according to signal quality; and (g22) selecting a plurality of said candidate cells having sufficient signal quality, said plurality forming a priority list for requesting target cells.

10. A method as recited in claim 1, wherein said transceivers are orbiting satellites.

11. A method as recited in claim 1, wherein each of said transceivers projects a plurality of said cells upon the earth.

12. A method as recited in claim 1, wherein said transceivers are located on the earth.

13. A method of selecting a target cell for a subscriber unit in a cellular communication system, said system having a plurality of transceivers projecting cells upon the earth, said method comprising the steps of:

(a) procuring a list of control channels for searching;

(b) measuring a signal quality of one of said control channels from said list;

(c) measuring a Doppler value of said one of said control channels as received at said subscriber unit;

(d) comparing said signal quality of said one of said control channels with a threshold value;

(e) retaining said one of said control channels as a candidate cell when said signal quality exceeds said threshold value;

(f) comparing said Doppler value with any previous Doppler values from other said control channels to determine a maximum Doppler value;

(g) repeating steps (b) through (f) for each of said control channels of said list;

(h) comparing said Doppler values of said one of said candidate cells with said maximum Doppler value;

(i) selecting a group of said candidate cells having a said Doppler value near said maximum Doppler value; and (j) selecting said target cell from said group of said candidate cells, said target cell having the best signal quality of said group.

14. A cellular communications system using Doppler value for selecting said target cell from among a group of candidate cells, said system comprising:

a subscriber unit for measuring a signal quality and said Doppler value of each of at least one control channel known to said subscriber unit, and when said signal quality of one of said at least one control channel exceeds a signal quality threshold value retaining said one of at least one control channel in said group of candidate cells and ordering said group of candidate cells according to said Doppler value of each of said at least one control channel, said subscriber unit also selecting said target cell from said group of candidate cells as ordered by said Doppler value;

a plurality of transceivers projecting cells upon the earth, said transceivers and said subscriber unit being in relative motion so as to generate said Doppler value; and a gateway for interfacing telephony communications with transceivers.

15. A cellular communications system as recited in claim 14, wherein said transceivers are orbiting satellites.

16. A cellular communications system as recited in claim 14, wherein each of said transceivers projects a plurality of said cells upon the earth.

17. A cellular communications system as recited in claim 14, wherein said transceivers are located on the earth.

18. A subscriber unit for use in a cellular communications system, said system having a plurality of cell transceivers projecting cells having at least one control channel upon the earth, said subscriber unit comprising:

transceiver means for receiving each of said at least one control channel from said plurality of cell transceivers;

means operatively coupled to said transceiver for measuring a signal quality and a Doppler value as received at said transceiver for each of said at least one control channel known to said subscriber unit;

means for evaluating and retaining in said group of candidate cells each of said at least one control channel when said signal quality of one of said at least one control channel exceeds a signal quality threshold value;

means, responsive to said evaluating means, for ordering said group of candidate cells according to said Doppler value of each of said group of candidate cells and for selecting said target cell from said group of candidate cells.

19. A subscriber unit for use in a cellular communications system as recited in claim 18, wherein said system further comprises a means for storing a list of said control channels.

* * * * *